(12) United States Patent
Rosakis et al.

(10) Patent No.: US 7,369,251 B2
(45) Date of Patent: May 6, 2008

(54) FULL-FIELD OPTICAL MEASUREMENTS OF SURFACE PROPERTIES OF PANELS, SUBSTRATES AND WAFERS

(75) Inventors: Ares J. Rosakis, Altadena, CA (US); David Owen, Redondo Beach, CA (US); Stephen Gledden, Fitzroy North (AU); Sean Olson, Santa Monica, CA (US)

(73) Assignee: Ultratech, Inc., San Jose, CA (US)

( * ) Notice: Subject to any disclaimer, the term of this patent is extended or adjusted under 35 U.S.C. 154(b) by 335 days.

(21) Appl. No.: 10/767,406

(22) Filed: Jan. 28, 2004

(65) Prior Publication Data

US 2004/0257587 A1 Dec. 23, 2004

Related U.S. Application Data

(60) Provisional application No. 60/443,342, filed on Jan. 28, 2003, provisional application No. 60/443,329, filed on Jan. 28, 2003, provisional application No. 60/443,804, filed on Jan. 29, 2003.

(51) Int. Cl.
*G01B 9/02* (2006.01)
(52) U.S. Cl. .................. 356/515; 356/514; 356/520
(58) Field of Classification Search ................ 356/520, 356/511–516, 498, 499, 495, 489
See application file for complete search history.

(56) References Cited

U.S. PATENT DOCUMENTS

| | | | |
|---|---|---|---|
| 4,213,706 A * | 7/1980 | Hill et al. ................... 356/520 |
| 4,575,248 A * | 3/1986 | Horwitz et al. ............. 356/520 |
| 4,643,576 A | 2/1987 | Kanoh et al. |
| 5,094,528 A * | 3/1992 | Tyson et al. ............... 356/35.5 |
| 5,481,356 A * | 1/1996 | Pouet et al. ............... 356/35.5 |
| 5,493,398 A * | 2/1996 | Pfister ........................ 356/512 |
| 6,031,611 A | 2/2000 | Rosakis et al. |
| 6,411,389 B1 * | 6/2002 | Rushford .................... 356/492 |
| 6,469,788 B2 | 10/2002 | Boyd et al. |
| 6,513,389 B2 | 2/2003 | Suresh et al. |
| 6,600,565 B1 | 7/2003 | Suresh et al. |
| 6,717,681 B1 * | 4/2004 | Bard et al. .................. 356/520 |
| 6,781,702 B2 | 8/2004 | Giannakopoulos et al. |
| 2004/0075825 A1 | 4/2004 | Suresh et al. |

* cited by examiner

*Primary Examiner*—Hwa (Andrew) Lee
(74) *Attorney, Agent, or Firm*—Allston L. Jones

(57) ABSTRACT

Techniques and systems for using optical interferometers to obtain full-field optical measurements of surfaces, such as surfaces of flat panels, patterned surfaces of wafers and substrates. Applications of various shearing interferometers for measuring surfaces are described.

38 Claims, 10 Drawing Sheets

FULL-FIELD OPTICAL MEASUREMENTS OF SURFACE PROPERTIES OF PANELS, SUBSTRATES AND WAFERS

This application claims the benefits of U.S. Provisional Application Nos. 60/443,342 and 60/443,329 filed on Jan. 28, 2003, and U.S. Provisional Application No. 60/443,804 filed on Jan. 29, 2003. The entire disclosure of the above three applications is incorporated herein by reference as part of this application.

BACKGROUND

This application relates to measurements of surface slopes and other topological properties of surfaces in flat panels, substrates, and wafers, and more particularly, to optical techniques and systems for such measurements.

Optical interference occurs when two or more optical beams that are at least partially coherent spatially overlap with one another. Various optical interferometers use interference of two coherent optical beams to produce an interference pattern of interference fringes caused by the differences in optical path lengths of the two interfering optical beams. One application of such interference is to extract information embedded in at least one of the interfering beams in the optical measurements and to characterize properties of surfaces under investigation such as surface topographical properties.

SUMMARY

This application includes optical techniques and systems for using optical interferometry to achieve non-invasive, full-field measurements of patterned and unpatterned surfaces in various devices and structures. Described implementations include measurements of patterned and unpatterned surface profiles of various surfaces by using optical shearing interferomety. Optical interferometry techniques for illumination of a un-patterned backside surface of a wafer or substrate with a patterned front surface are also described. When properly configured, a surface monitoring system based on one of the disclosed optical techniques may provide full-field measurements of a surface in real time. In addition, such a surface monitoring system may provide in-situ monitoring of a wafer under processing.

In one implementation, for example, an optical probe beam with a substantially uniform wavefront is used to illuminate a surface under measurement to produce a reflected probe beam with a reflected wavefront that carries distortions caused by an illuminated area on the surface. The reflected probe beam is directed through an optical shearing interferometer device to obtain an optical interference pattern between the reflected wavefront and another replica of the reflected wavefront that is spatially shifted by a shearing distance. Next, a phase shift between the reflected wavefront and the replica of the reflected wavefront is adjusted to obtain a plurality of phase-shifted interference patterns of different phase shifts from the optical shearing interferometer. The interference patterns are then processed to obtain information on surface slopes across the illuminated area in the surface under measurement.

In another implementation, support members are to contact a backside surface of a wafer to hold the wafer. The wafer is fabricated with patterns on a front surface opposite to the backside surface. The backside surface is illuminated with a probe beam to produce a reflected probe beam with a reflected wavefront that carries distortions caused by an illuminated area on the backside surface. An optical interference pattern is then produced with the reflected probe beam to include discontinuities due to presence of support members on the backside surface. An interpolation algorithm is applied in processing the optical interference pattern to interpolate interference fringes caused by the backside surface across regions with the discontinuities to obtain interference pattern features within the illuminated area that are caused solely by the backside surface. Next, the interpolated interference pattern from the backside surface are processed to obtain surface slopes of corresponding positions on the front surface of the wafer.

Alternatively, the above interpolation in data processing may be substituted by additional measurements and processing to obtain data in the areas on the backside surface occupied by the support members. For example, without applying the interpolation, the interference pattern from the backside surface is processed to obtain surface slopes of corresponding positions on the front surface of the wafer. Next, the angular orientation of the wafer on the support members is changed at least once to obtain at least one another reflected optical probe beam from the same optical probe beam and thus another optical interference pattern. The other interference pattern from the backside surface is then processed to obtain surface slopes of corresponding positions on the front surface of the wafer. The surface slopes obtained from different interference patterns at different angular orientations of the wafer are then compared. The missing data found at a location in one interference pattern is filled by data at the same location in another interference pattern obtained at a different angular orientation.

This application also describes techniques for using interference patterns obtained at different shearing distances in a shearing interferometer to improve the measurements. In one implementation, for example, an optical probe beam with a substantially uniform wavefront is used to illuminate a surface under measurement to produce a new optical beam with a distorted wavefront caused by the surface. The new optical beam is directed through an optical shearing interferometer to obtain an optical interference pattern between the distorted wavefront and another replica of the distorted wavefront that is spatially shifted by a shearing distance. The shearing distance is then adjusted to obtain optical interference patterns at different shearing distances. These interference patterns at different shearing distances are processed to extract information on the surface under measurement.

In the above example, two interference patterns with two different shearing distances may be subtracted to produce a differentiate interference pattern that corresponds to a new shearing distance equal to a difference between the two different shearing distances. This technique can be used to obtain data at a small shearing distance that may be difficult to achieve with the given shearing interferometer.

This application further describes a number of shearing interferomters different from a coherent gradient sensing (CGS) system for measuring surfaces. These non-CGS shearing interferometers may have certain advantages over CGS in specific applications.

These and other implementations, examples, and their variations, and advantages are described in greater detail in the drawings, the detailed description, and in the claims.

DETAILED DESCRIPTION

Figure 1:
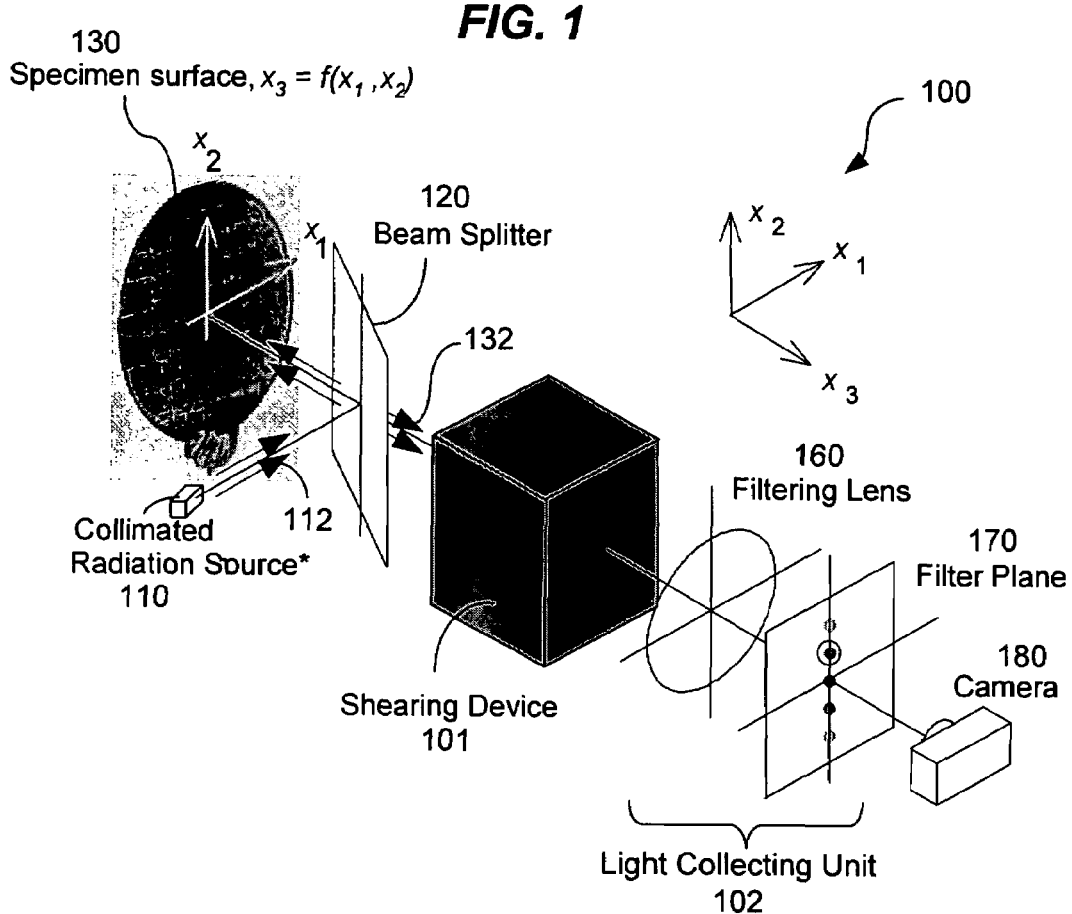
FIG. 1 shows a system with a shearing device for measuring a surface according to one implementation.

Optical shearing interferometers produce and interfere two spatially shifted replicas of the same, usually distorted wavefront of an optical beam along a direction transverse to the direction of propagation of the said wavefront. For example, transverse and radial shearing interferometers may be used. The interference between the spatially shifted replicated wavefronts generates an interference pattern representing the spatial distribution of slopes in the wavefront. In effect such interferometers perform an optical differentiation of the wavefront. In some of the examples for optically measuring surfaces described in this application, at least one optical shearing interferometer may be used to optically measure a surface by illuminating the surface with a collimated probe beam. The shearing interferometer may be configured to produce a shearing interference pattern from either of the optical transmission of the probe beam through the surface or from the optical reflection of the probe beam by the surface. The shearing interference pattern is then processed to obtain surface, slopes, curvatures and other surface topographical information. For example, surface topography on the global profile of the surface and nanotopography on the local profile of the surface may be obtained from the shearing interferometer. Examples of measurable surfaces include but are not limited to surfaces in various panels and plates, various substrates and wafers, integrated electronic circuits, integrated optical devices, opto-electronic circuits, and micro-electro-mechanical systems (MEMs), flat panel display systems (e.g., LCD and plasma displays), and photolithography masks, pellicles and reticles.

The use of optical shearing interferometry presents certain advantages in optically measuring surfaces. Optical hearing interferometry may be an effective measuring tool for surfaces patterned with various microstructures such as patterned wafers and patterned mask substrates. In addition, an optical shearing interferometer may be used for in-situ monitoring of the surface properties such as curvatures and related stresses during fabrication of devices at the wafer level and the measurements may be used to dynamically control the fabrication conditions or parameters in real time. As an example, measurement and operation of an optical shearing interferometer generally is not significantly affected by rigid body translations and rotations due to the self-referencing nature of the optical shearing interferometry. Hence, a wafer or device under measurement may be measured by directing a probe beam substantially normal to the surface or at low incident angles without affecting the measurements. By shifting or shearing the wavefront, the optical shearing interferometer measures the deformation of one point of the wavefront to another separated by the shearing distance, i.e., the distance between the two interfering replicas of the same wavefront. In this sense, the optical shearing interferometer is self referencing and thus increases its insensitivity or immunity to vibrations of the wafer or device under measurement. This resistance to vibrations may be particularly advantageous when the measurement is performed in a production environment or in situ during a particular process (e.g. deposition within a chamber), where vibration isolation is a substantial challenge.

As a comparison, many non-shearing interferometers generate wavefront interference of topology or topography (surface elevation) based on optical interference between a distorted wavefront reflected from a sample surface and an undistorted, reference wavefront reflected from a known reference surface. The use of such non-shearing optical interferometers for measuring patterned surfaces may be ineffective because, in many cases, the relatively non-uniform or diffuse wavefront reflected off the patterned surface may not interfere coherently with the wavefront reflected off the reference surface. Also, a patterned surface may have substantially different reflective properties, e.g., certain areas of the patterned surface are highly absorbing at the probe wavelength than other areas of the patterned surface or the reference surface. In these and other circumstances, it may be difficult to unwrap and interpret the interferometric images produced by such non-shearing interferometers in the presence of extensive patterning.

Another feature of the shearing interferometry is that the wavefront is optically differentiated once and the optical differentiation is recorded in the shearing interference pattern. Hence, only a single derivative operation on the data from the shearing interference pattern is sufficient to calculate curvatures from slopes of the wavefront. This reduces the amount of computation in processing the interference data and thus reduces the time for data processing. Also, because the shearing interferometry method provides full-field interferometric data it can utilize many more data points compared to other methods such as the method of using a conventional capacitive probe to measure a few points (e.g., 3 points) of surface topology. This higher data density provides more accurate measurements and better resistance to noise than other methods which feature much less density of measured data. In addition, although various laser beam scanning tools may be used to measure wafer bow or surface curvature, these methods typically measure radial curvature only. Shearing interferometry may be easily implemented to measure surface slopes in two orthogonal directions (X and Y) within the surface and thus allow for elucidation of the full curvature tensor and the associated stress states of the wafer or substrate.

In applying shearing interferometry for measuring patterned surfaces on wafers and other structures (e.g. patterned mask elements), the patterned wafers, e.g., semiconductor and optoelectronic wafers with diameters of 200 mm, 300 mm or other wafer sizes may be placed in a shearing interferometer in a configuration that allows a collimated probe beam to be reflected off the wafer surface. The shearing interferometer uses the reflected probe beam from the wafer surface to produce the two interfering wavefronts, which are substantially similar in shape after being sheared by a small shearing distance. Hence, the interference between the two wavefronts produces coherent interference. Although each wavefront reflected off a patterned surface may be inherently noisy and diffuse, sufficient coherence exists between the wavefronts to produce meaningful fringe patterns and can be interpreted to extract surface information.

FIG. 1 illustrates one implementation of a system 100 for measuring a specimen surface 130 based on optical shearing interferometry. A light source 110 is provided to produce a collimated probe beam 112 with a substantially uniform wavefront. The light source 110 may produce radiation in a wide range spectral ranges including visible and invisible wavelengths (e.g., IR and UV radiation). The light from the source 110 may be cohereant or incoherent light. This probe beam 112 is directed to illuminate the surface 130 and to produce a reflected probe beam 132. An optical element 120 such as a beam splitter may be used to direct the probe beam 110 to the surface 130 and to transmit the reflected probe beam 132. A shearing device 101, i.e., an optical shearing interferometer, is placed in the optical path of the reflected probe beam 132 to generate a shearing interference pattern from the reflected probe beam 132. Oblique incidence of the collimanted beam 112 onto the reflective surface 130 may also be used and the beamsplitter element 120 is bypassed. In general, any shearing interferometer may be used to implement the shearing device 101. In actual applications, different shearing configurations may have unique features or attributes and hence are different from one another in this context. Examples of the shearing device 101 include a coherent gradient sensing (CGS) system using optical gratings to cause the shearing of the wavefront, a radial shear interferometers, wedge plate in a Bi-Lateral Shearing Interferometer (U.S. Pat. No. 5,710,631), and others, some of which are described in later sections of this application.

The system 100 also includes a light collecting unit 102 in the output optical path of the shearing device 101 to direct the optical output of the shearing device 101, the shearing interference pattern, to an imaging sensor 180, such as a camera (e.g., a CCD or other pixel sensing array). The light collecting unit 102 may include a filtering lens 160 and a spatial filter plane 170 when the shearing device 101 uses optical gratings to produce the shearing. The imaging sensor 180 converts the shearing interference pattern into an electronic form and a signal processing circuit which may include a computer is used to process the shearing interference pattern to extract desired surface information.

The measurements of patterned wafers by optical reflection with a shearing interferometer may be improved by using phase shifting in the measurements. Phase shifting may be implemented to progressively adjust the phase separation between the two shifted interfering wavefronts which cycles or manipulates fringe position on the specimen's surface under measurement. In one implementation, a shearing interferometer may be configured to obtain multiple phased images of a patterned wafer's surface, for example at 0, 90, 180, 270 and 360 degrees in phase. The phase shifting method allows for the wavefront slope to be measured by calculating the "relative phase" modulation at each pixel on a detector array that receives the interference pattern. The phase shifting method also allows for consistent interpretation of wavefront and specimen slope on a surface that exhibits changing reflectivity, like those found on patterned wafers. On a patterned wafer surface, each pixel location on the specimen may reflect light with a varying degree of intensity relative to other pixel locations. This may complicate the interpretation of any single shearing interferogram. The phase shifting method in shearing interferometry can simultaneously increase the accuracy of the slope resolution and allow for accurate interpretation of interferograms on patterned surfaces with a spatially varying optical reflectivity. This is possible in part because the relative phase of each pixel or location within the shearing interfering pattern rather than merely the variation in the fringe intensity is measured.

Figure 2:
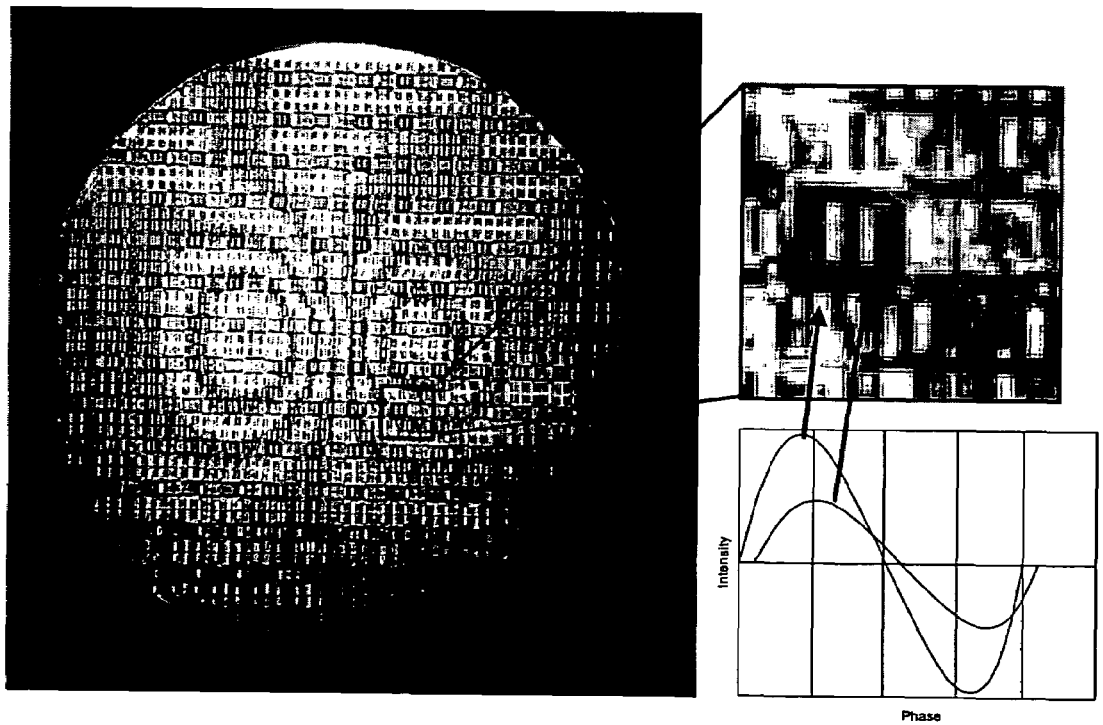
FIG. 2 shows an interference pattern to illustrate a phase shifting technique.

FIG. 2 illustrates an example of a measurement of the relative phase in the phase-shifted interference pattern. The interference pattern image on the left was collected off the patterned surface of a 300 mm silicon wafer. The interference pattern represents one out a series of, for example, 5 phase-shifted interference patterns. The detail in the upper right portion of the image illustrates that locally, the fringe intensity may vary dramatically from point to point as a result of the patterning on the wafer surface. For comparison, a fringe pattern on a bare or continuous surface would have smooth and continuous variations in fringe intensity. The inserted graph in the bottom right of FIG. 2 shows schematically the variation in the fringe intensity as a function of the phase-shift value or angle for two points on the patterned wafer surface. The phase axis has angular increments of 90 degrees, whereas the intensity axis is meant to represent the full dynamic range of the CCD or other imaging array. Point 1 marked by the arrow on the left corresponds to a pixel region on the wafer where the reflectivity is relatively high and is indicated schematically by the large amplitude of the curve. Point 2 marked by the arrow on the right corresponds to a pixel region on the wafer where the reflectivity is relatively low and is indicated schematically by the smaller amplitude curve. When phase shifting is implemented, the relevant quantity of interest is the relative phase angle, or the horizontal offset of one curve (e.g. Point 1 curve) relative to the other (e.g. Point 2 curve), and not the amplitude of the curve. The intensity amplitude at any given point from a series of phase shifted interferograms should be sufficiently large to enable adequate characterization of the relative phase offset.

In implementation of the phase shifting, the collected multiple phase-shifted interferograms of the patterned wafer surface are subsequently processed by a phase extraction algorithm and a unwrapping algorithm to accurately interpret the surface slopes embedded in the phase-shifted interferograms. Suitable phase extraction algorithms may include Bucket nA, nB, or nC, where 'n' is the number of frames in the phase shifted data set. Phase extraction algorithms other than the above Bucket A type, Bucket B type, and Bucket C type algorithms may also be used. Suitable unwrapping algorithms may include Minimum Discontinuity (MDF) and Preconditioned Conjugate Gradient (PCG) algorithms. In addition, Branch Cut Minimization and Tiled Modulation Guided algorithms may also be used to process the phase-shifted interferograms and may be effective in unwrapping lightly patterned surfaces.

Once the phase-shifted interferograms have been unwrapped, the interpretation of raw slope data and the derivation of curvature may be enhanced by statistically fitting a surface polynomial to the raw slope data. Statistical surface fits, including Zernicke polynomials and Legendre polynomials, may be applied to raw slope data derived from Patterned Wafers for the purpose of deriving topography (or nanotopography) and curvature data.

One property of the shearing interferometry due to its self-referencing nature is that the resulting shearing interference pattern essentially measures the deviations from flatness of the surface under measurement by using the surface itself as a reference surface. Such relative data on surface height or flatness may be useful in various applications where the height or flatness of a surface is monitored or controlled. For example, in a chemical mechanical polishing (CMP) process or other surface polishing processes, the relative height across the surface may be monitored to determine the effectiveness of the polishing process. A shearing interferometer may be used to monitor the surface flatness and the measurements may be used to dynamically control the polishing condition of the polishing process in real time.

In some implementations, the shearing distance between the transversely shifted wavefronts that interfere with each other may be adjusted during the measurement process to improve the resolution and accuracy of the data. By capturing interferometric images of the surface at multiple increments of shearing distances, it is possible to resolve features smaller than the effective pixel size of the camera or imaging sensing array being used to sample the interferometric data. In addition, as described later in this application, the use of multiple shearing distances enables the highly accurate calculation of the estimated surface topography or nanotopography from the relative data by a geometric calculation rather than a standard numerical integration algorithm to compute the actual surface profile.

Referring back to FIG. 1, the system 100 may be used to measure surfaces of a variety of wafers, substrates, flat panels or lithographic mask elements. The system 100 can simultaneously measure each and every point in the illuminated area on the specimen surface to obtain information on the flatness, topography, slope, curvature and stress. The shearing interferometry may be especially advantageous in measuring patterned surfaces such as microfabricated surfaces commonly found in semiconductor or optoelectronics wafers and substrates. The shearing device 101 may produce coherent or semi-coherent interference on a patterned surface.

Figure 3:
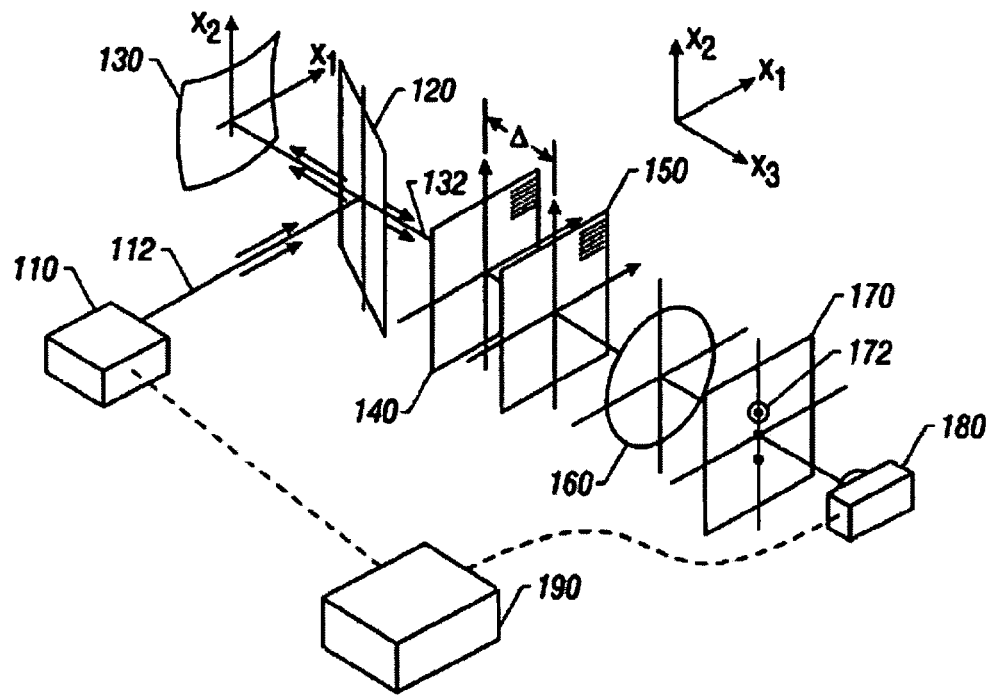
FIGS. 3 and 4 show two coherent gradient sensing (CGS) systems for measuring surfaces.

As an example, FIG. 3 shows an exemplary implementation of a coherent gradient sensing ("CGS") system 300 based on the system design in FIG. 1. Certain aspects of the system 300 are described in U.S. Pat. No. 6,031,611 to Rosakis et al., which is incorporated herein by reference. The CGS system 300 uses a collimated coherent optical beam 112 from a light source 110 as an optical probe to obtain surface slope and curvature information indicative of a specularly reflective surface 130 formed of essentially any material. An optical element 120 such as a beam splitter can be used to direct the beam 112 to the surface 130. When the reflective surface 130 is curved, the wavefront of the reflected probe beam 132 is distorted and thereby the reflected probe beam 132 acquires an optical path difference or phase change associated with the surface topographic of the surface 130 under measurement. This system produces a "snapshot" of each point within the illuminated area on the surface 130 and hence the surface topographic information at any point along any direction within the illuminated area can be obtained. This can eliminate the need for measuring one point at a time in a sequential manner by scanning a probe beam one point at a time across the surface 130.

Two gratings 140 and 150 spaced from each other by Δ are placed in the path of the reflected probe beam 132 to manipulate the distorted wavefront for curvature measurement. Two diffraction components produced by the second grating 150 diffracting two different diffraction components produced by the first grating 140 are combined, by using an optical element 160 such as a lens, to interfere with each other. When a lens is used as the optical element, the two diffracted beams produced by the second grating 150 and combined by the lens have the same diffraction angle out of the second grating 150 and thus are parallel to each other. The diffraction by the two gratings 140 and 150 effectuates a relative spatial displacement, i.e., a lateral spatial shift, between the two selected diffraction components. This shift is a function of the spacing Δ between the two gratings 140 and 150 when other grating parameters are fixed. More specifically, the shearing distance is (Δ×tan θ), where θ is the diffraction angle of two interfering diffraction beams. Hence, the gratings 140 and 150 produce two spatially shifted wavefronts from the same wavefront of the reflected probe beam 132. A spatial filter 170 is placed relative to the optical element 160 to transmit the interference pattern of the selected diffraction components and to block other diffraction orders from the second grating 150. In general, any desired diffraction order or combination of orders may be selected for the measurements.

The transmitted interference pattern is then captured by an imaging sensor 180 which may include an array of sensing pixels, such as a CCD array, to produce an electrical signal representing the interference pattern. A signal processor 190, processes the electrical signal to extract a spatial gradient of the wavefront distortion caused by the topography of the reflective surface 130. This spatial gradient, in turn, can be further processed to obtain the curvature information and hence a curvature map of the illuminated area on the surface 130 can be obtained. A single spatial differentiation is performed on the interference pattern to measure the surface gradient. This technique can provide accurate measurements of surface curvatures and the accuracy is high when the curvature variation of the surface is gradual, i.e., when the out-of-plane displacement is less than the thickness of the film, the line or the substrate. This technique is insensitive to rigid body motions in contrast to some other interferometric techniques. Details of this data processing operation are described in the above-referenced U.S. Pat. No. 6,031, 611 to Rosakis et al. Upon completing the processing for the surface slopes and curvatures, the processor 190 further operates to compute the stresses from the surface curvatures.

The two gratings 140 and 150 in general may be any gratings, with different grating periods and oriented with respect to each other at any angle. Preferably, the two gratings may be oriented with respect to each other in the same direction and may have the same grating periods to simplify the data processing. In this case, the grating direction is essentially set by the direction of the relative spatial displacement ("shearing") between the two selected diffraction components due to the double diffractions by the gratings 140 and 150.

Certain applications may require spatial shearing in two different directions to obtain a full-field two-dimensional slope and curvature measurement. This may be done by using the CGS system 300 to perform a first measurement when the sample surface 130 is at a first orientation and subsequently to perform a second measurement when the sample surface 130 is rotated to a second orientation (e.g., perpendicular to the first orientation).

Figure 4:
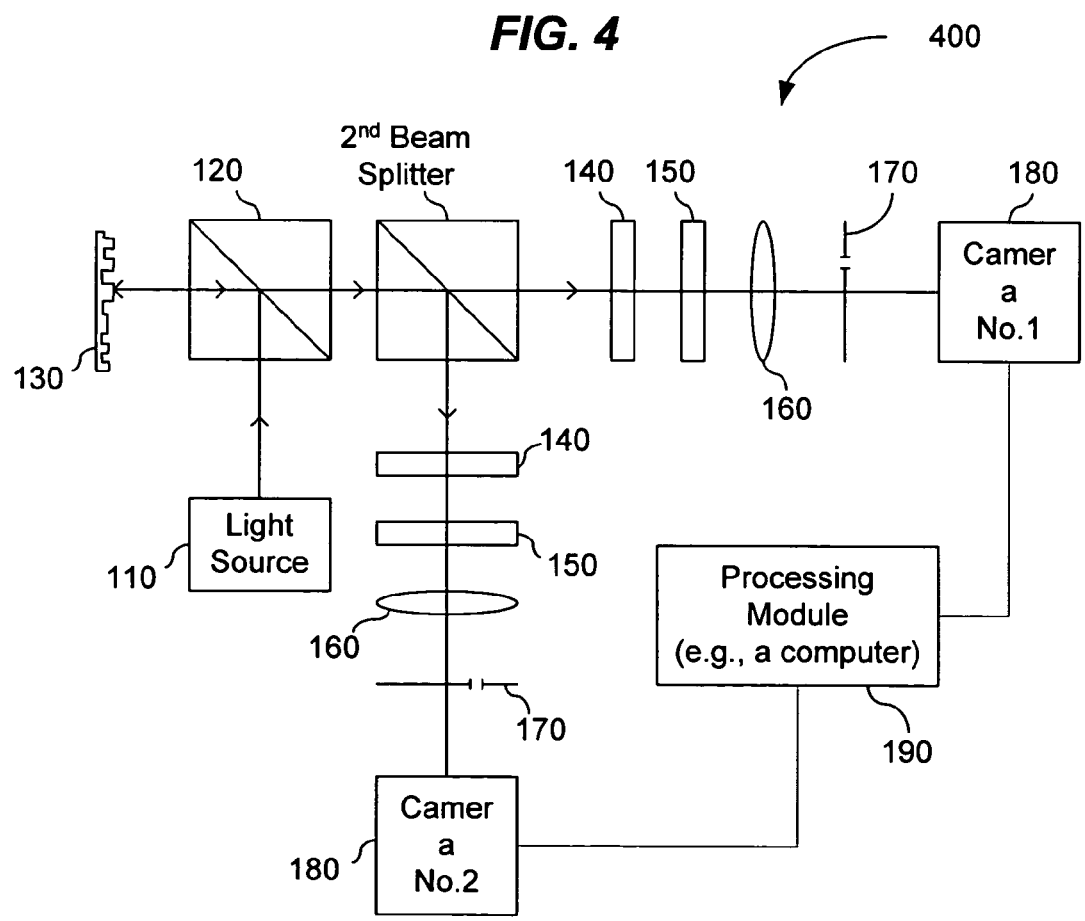

Alternatively, a two-arm CGS system, shown in FIG. 4 may be implemented to have two separate sets of double gratings in two different directions to simultaneously produce the interference pattern in two different spatial shearing directions. Hence, time-varying effects in the topography, slope and curvature distribution in both spatial shearing directions can be obtained.

In addition, each of the two gratings 140 and 150 in FIG. 3 may be replaced by a grating plate with two orthogonal cross gratings to effectuate the two dimensional shearing of the system in FIG. 4. The spatial filter 170 may be replaced by a substitute filter with an additional optical aperture shifted along the direction of x1 to selectively transmit an interference pattern for shearing along the orthogonal direction.

Figure 5A:
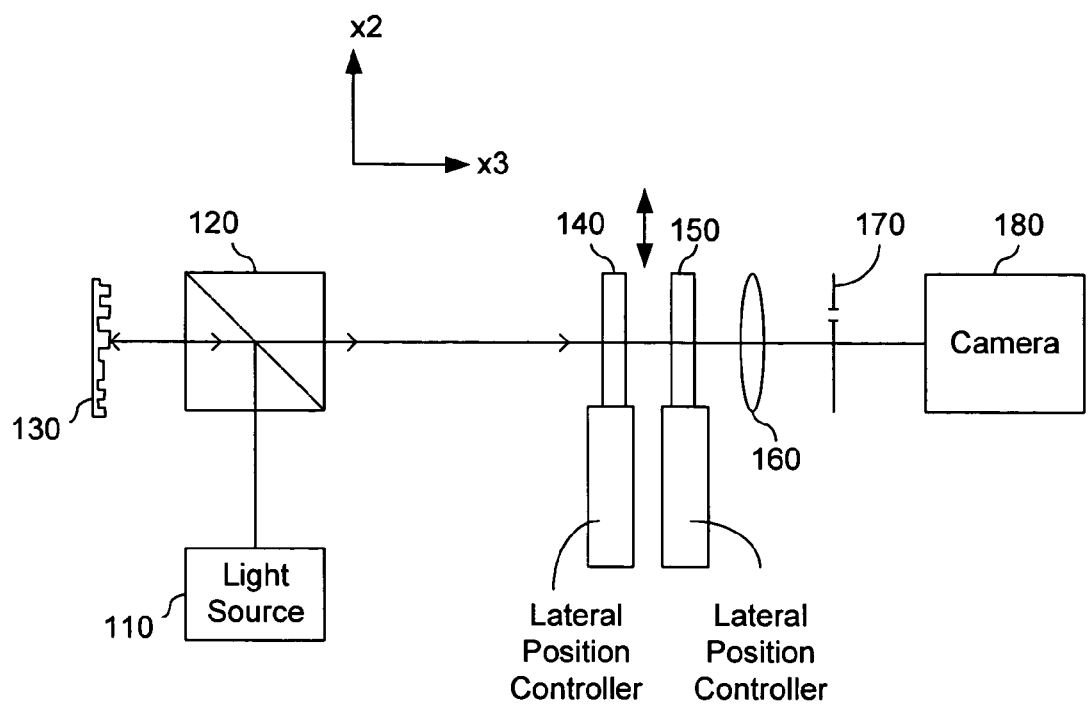
FIGS. 5A and 5B show two exemplary phase shifting techniques in CGS.

In the above exemplary CGS systems, the phase shifting may be achieved by changing the relative position between the two gratings 140 and 150. In one implementation, the relative position of the two gratings 140 and 150 in the transverse plane defined by directions x1 and x2 may be adjusted while maintaining the spacing between the two gratings 140 and 150 along the x3 direction fixed at a desired constant. FIG. 5A illustrates a CGS system where a positioning mechanism, such as precise translation stage or a positioning transducer, is used to implement this adjustment of the relative position between the gratings for phase shifting. At least one lateral position controller may be engaged to one of the two gratings to cause the lateral change in position. Two lateral position controllers may be respectively engaged to the two gratings 140 and 150 to cause the phase shift. In this implementation, the two gratings may be maintained to be parallel to each other with the fixed spacing during the lateral movement. Multiple shearing interference patterns with different lateral relative positions between the gratings 140 and 150 can be obtained for further processing with phase extraction and unwrapping algorithms.

Figure 5B:
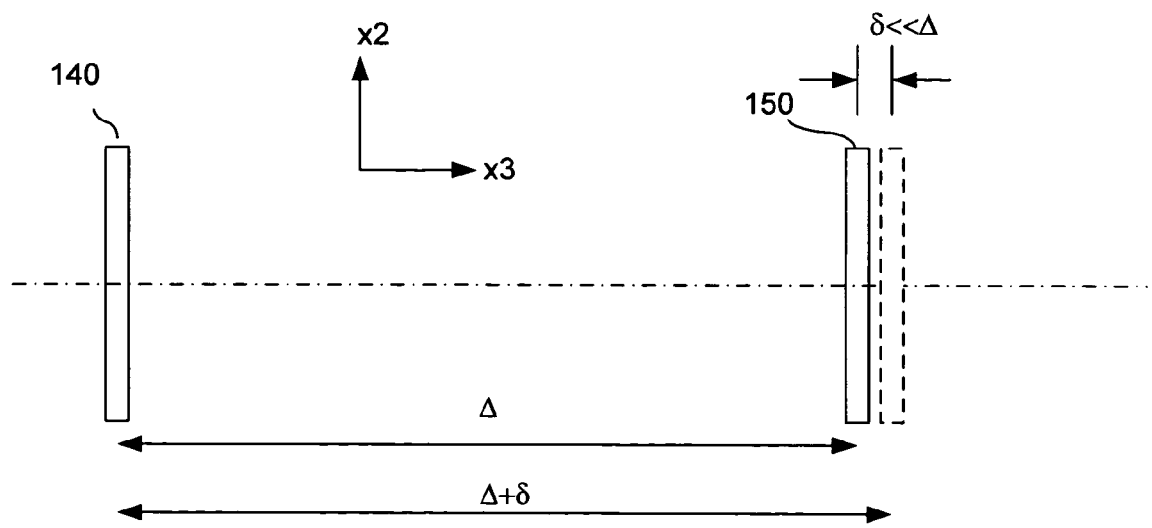

FIG. 5B shows another way for implementing the phase shifting mechanism in CGS. In this configuration, the relative lateral position between the two gratings 140 and 150 is fixed and the two gratings 140 and 150 are maintained to be substantially parallel. A position control mechanism is implemented to slightly change the spacing, $\Delta$, between the two gratings 140 and 150 along the x3 direction by a small amount of $\delta$. The magnitude of $\delta$ is much less than the desired spacing $\Delta$ so the spacing $\Delta$ and the measurement resolution is not significantly affected by the small change of $\delta$. This small change ($\delta$) in the spacing $\Delta$, however, changes the overall phase of the shearing interference pattern produced by the two gratings 140 and 150. In data acquisition, the spacing $\Delta$ is adjusted to have different small shifts ($\delta$) to obtain different shearing interference patterns with different phase shifts for s further processing with phase extraction and unwrapping algorithms.

In addition, the specimen surface 130 may be tilted at different small angles to produce different phase shifts in the corresponding interference patterns in the CGS system. These and other phase shifting mechanisms may be combined to effect desired phase shifts.

A CGS system may be designed with dynamically configurable shearing distances to allow for obtaining data with different shearing distances during the measurement process as described above for improving the resolution and accuracy of the measurements. At least one of the two gratings in a CGS system such as examples shown in FIGS. 3 and 4 may be engaged to a positioning stage or positioning transducer to change the relative spacing between the two gratings in a controlled manner to achieve measurements at different shearing distances.

In addition to CGS systems, other shearing interferometer configurations may also be used to implement the shearing device 101 in FIG. 1. Several examples are provided below. These shearing interferometers use optical elements different from gratings in CGS to generate the lateral shearing between two interfering wavefronts and have their respective unique features in measuring surfaces.

Figure 6A:
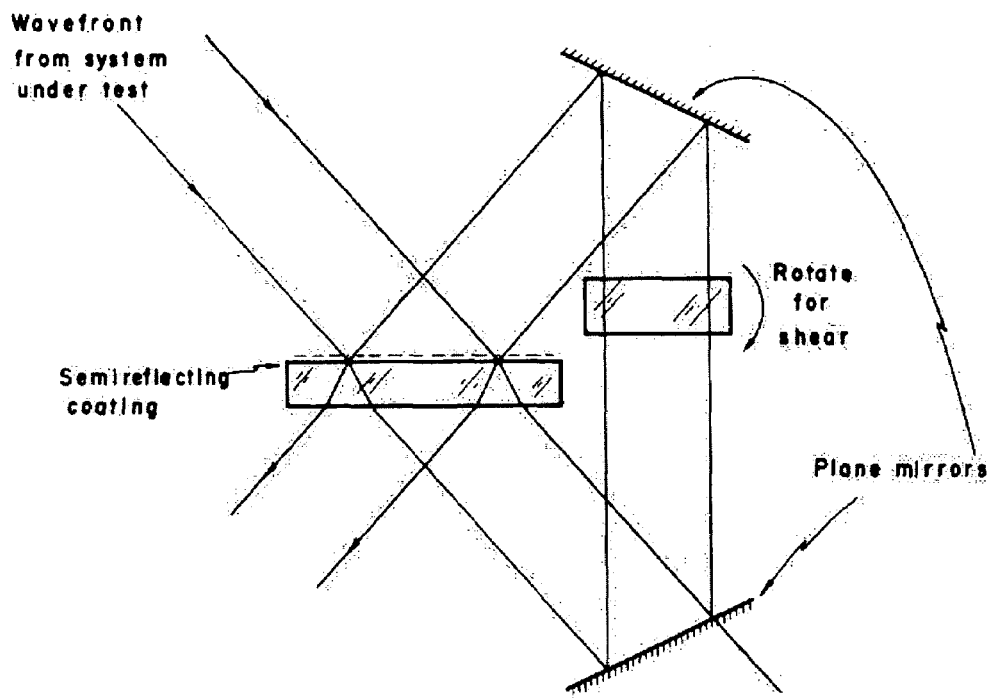
FIGS. 6A, 6B, 7A, 7B, 7C, 8, 9, 10A, 10B, 11A, 11B, and 11C show examples of non-CGS shearing interferometers suitable for measuring surfaces based on the techniques described in this patent application.
Figure 6B:
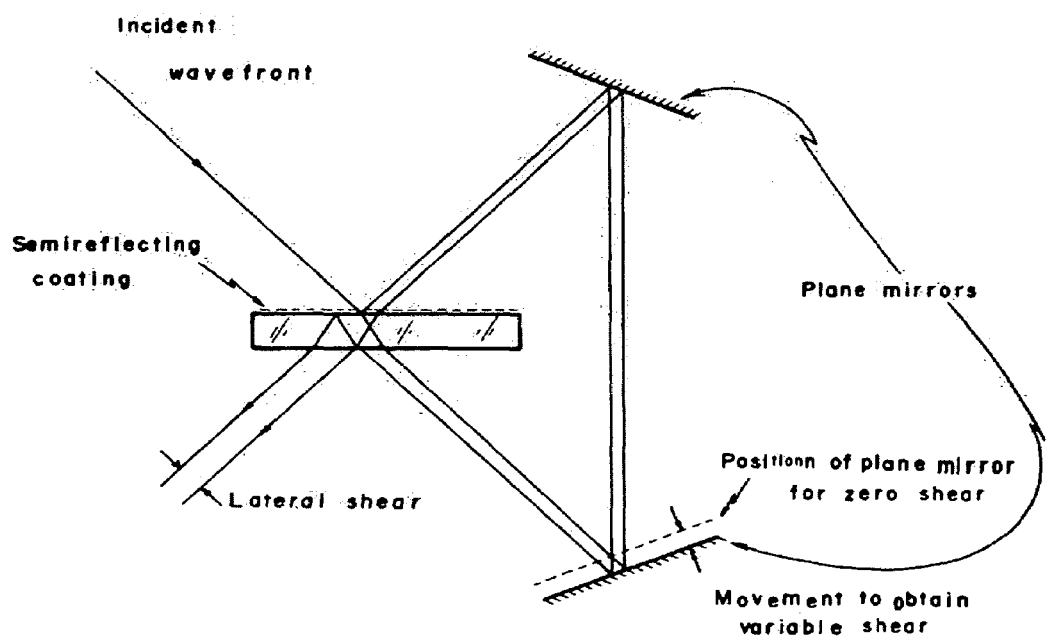
Figure 7A:
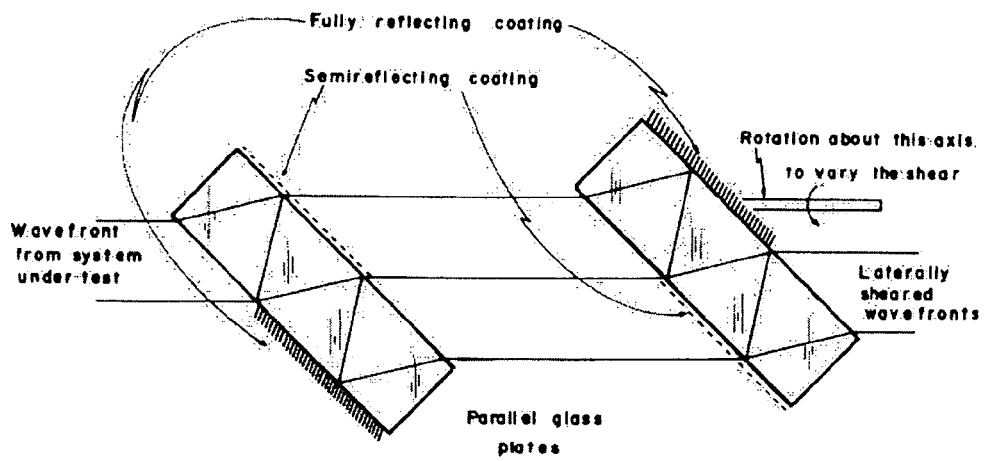
Figure 7B:
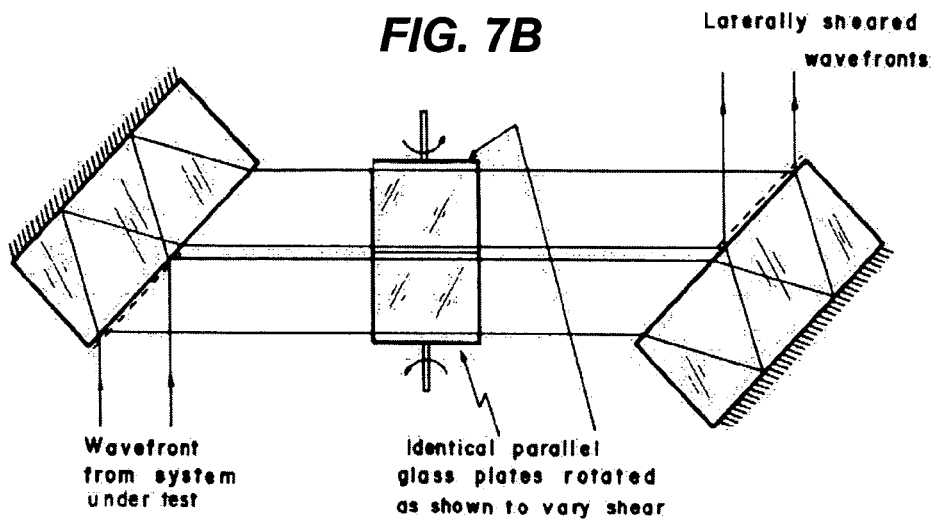
Figure 7C:
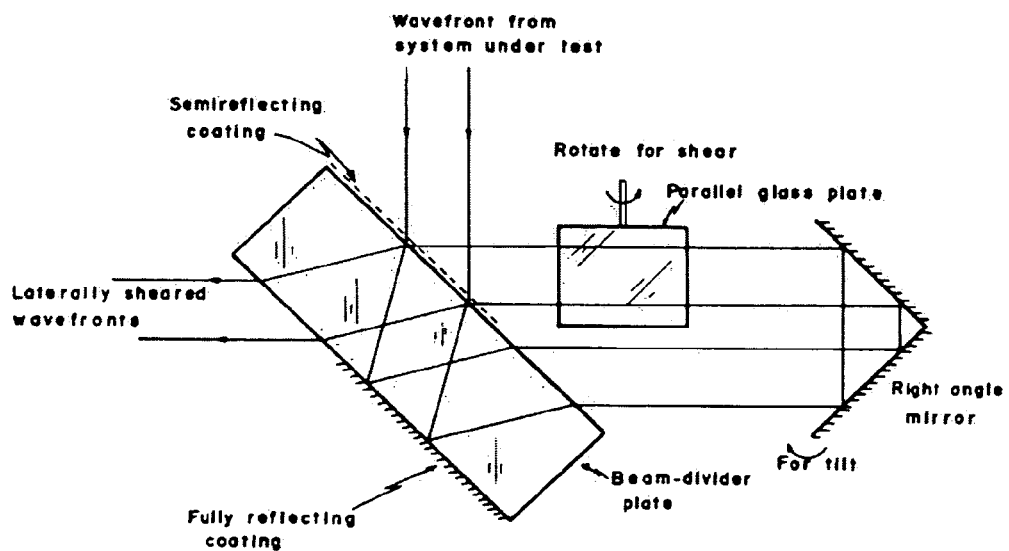
Figure 8:
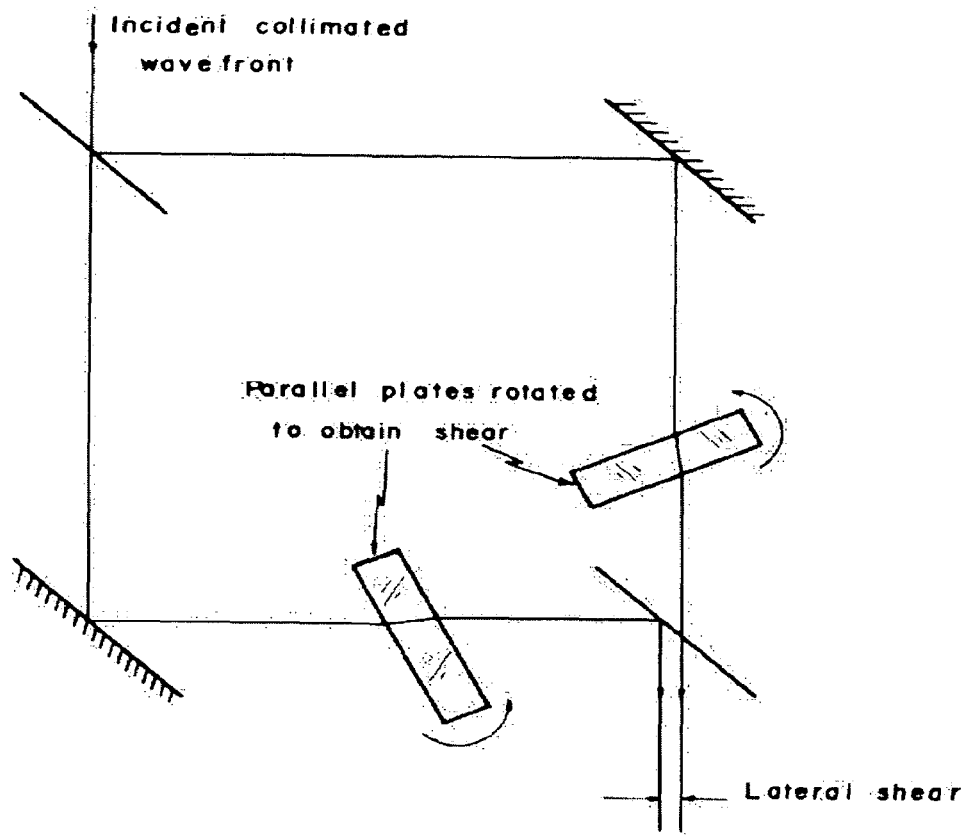
Figure 9:
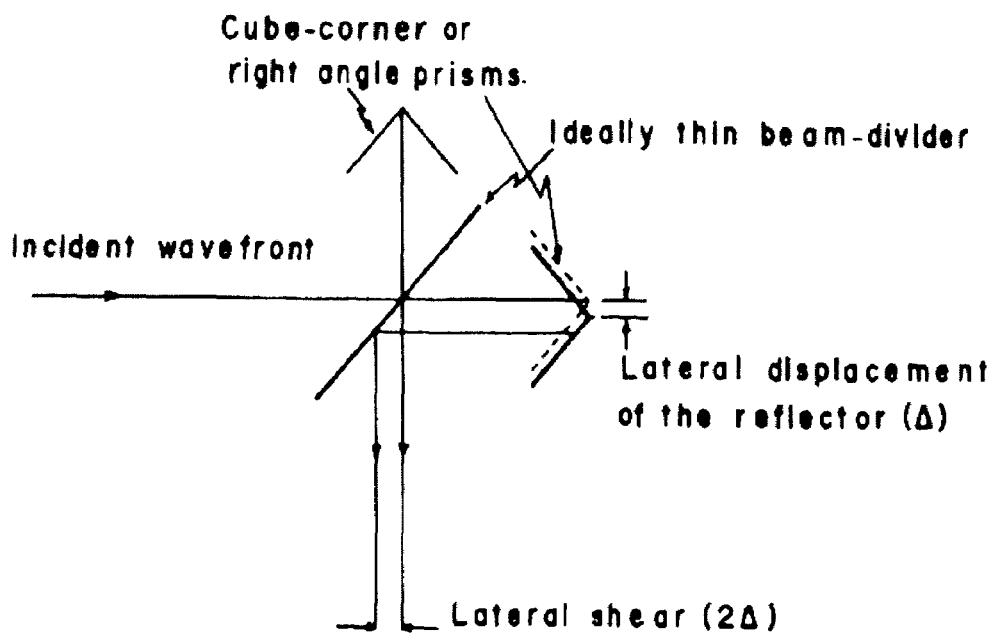
Figure 10A:
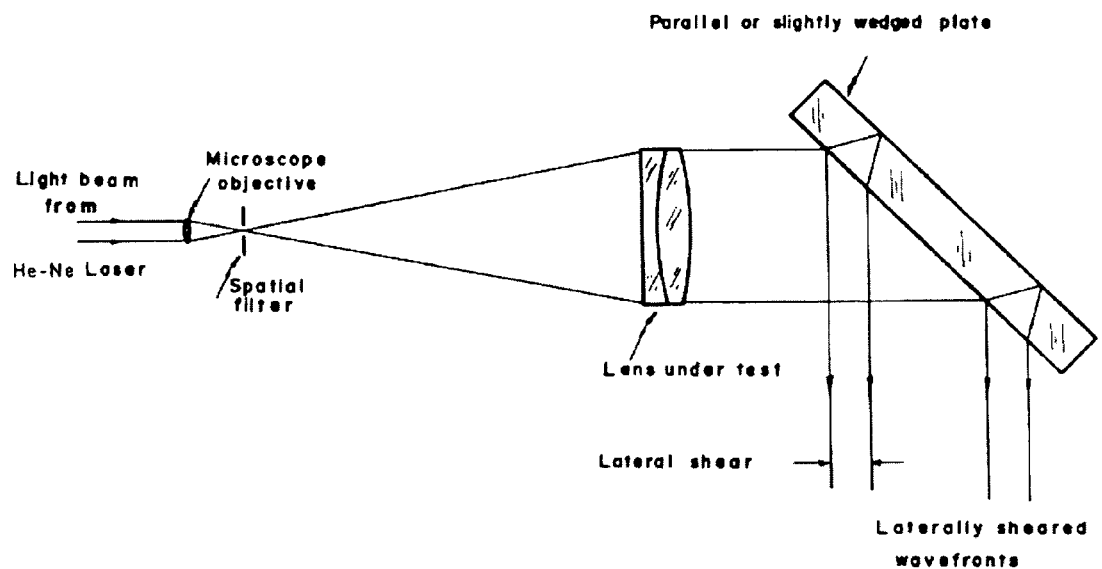
Figure 10B:
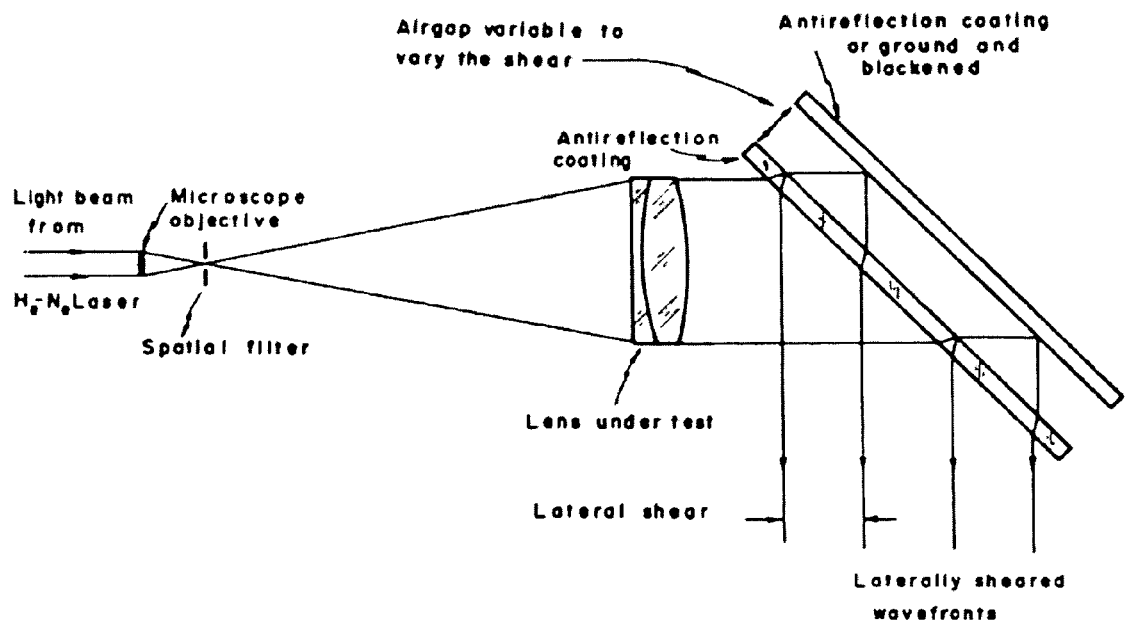
Figure 11A:
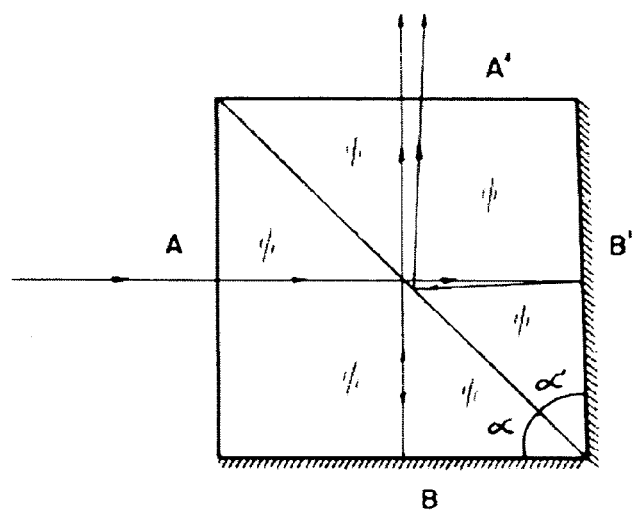
Figure 11B:
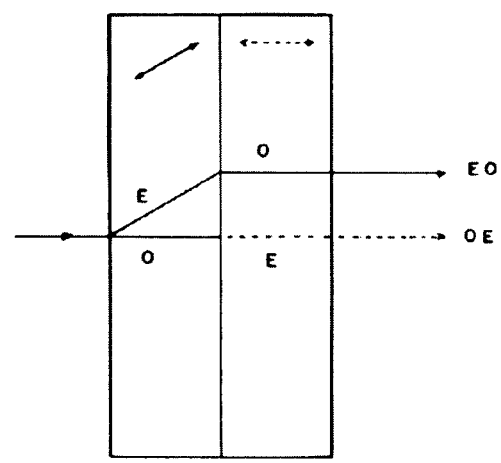
Figure 11C:
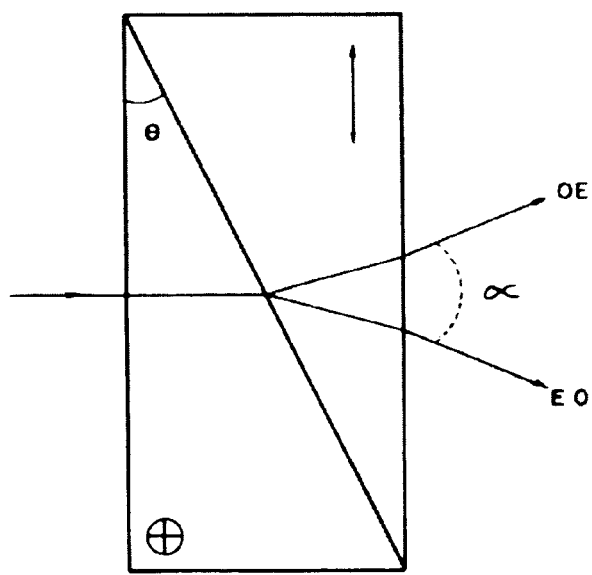

FIGS. 6A and 6B show two examples of cyclic shearing interferometers. A parallel plate with one semi-reflecting surface is used to split the received probe beam into two beams. FIG. 6A uses a rotating transparent plate in one of the two beams to produce the shearing and the variable shearing distance. FIG. 6B uses a movable mirror in the optical path to produce the shearing and the variable shearing distance by moving the mirror away from a position with a zero shear. The phase shifting may be achieved by slightly translating one of the two reflectors, or by tilting the parallel plate with the semi-reflecting surface. FIGS. 7A, 7B, and 7C show examples of Jamin shearing interferometers. FIG. 8 shows a Mach-Zehnder shearing interferometer. FIGS. 9 shows a Michaelson shearing interferometer. FIGS. 10A and 10B show two examples of parallel plate shearing interferometers capable of producing large shearing distances. FIGS. 11A, 11B, and 11C show prism shearing interferometers having two different prisms to produce the desired shearing. Structures and operations of these shearing interferometers are well known. The shearing distance may be controlled and adjusted by rotating a selected optical element in these interferometers. In general, the phase shifting can be achieved by tilting the specimen surface under measurement. In some of these interferometers, one optical element in the optical path may be translated to produce the desired phase shifting without tilting the specimen surface.

In these shearing systems, the uniformity of shearing distance across the field of view is relatively easy to control in comparison with a CGS system which needs to maintain parallel gratings as the separation between two gratings is changed. These systems are also relatively easy to achieve smaller shearing distances by nominally setting the systems at configuration with a zero shearing and by using slight rotations to achieve small shearing distances. In addition, these systems avoid the use of precision holding mechanism for the gratings and the in-line spatial filtering of unwanted diffraction orders in CGS. Due to these and other features, these non-CGS shearing interferometers may be used to optically measure surfaces in certain applications where CGS may be more difficult to implement.

The above non-CGS optical shearing interferometry systems may be configured and operated to achieve small shearing distances than the CGS due to their designs. However, both CGS and these non-CGS systems may be operated to achieve small effective shearing distances less than minimum shearing distances due to limitations of the mechanisms for adjusting the shearing distances. For example, a shearing interferometer may be operated to make two or more measurements at shearing distances with incremental differences. Two of such measurements may be combined to produce an effective shearing distance at the difference between the two close shearing distances. Hence, this use of multiple shearing distances enables highly accurate calculation of the estimated surface topology from the relative data by a geometric calculation without using a standard numerical integration algorithm to compute the actual surface profile. Details of this technique are provided below.

The characterization of high spatial frequencies (or low spatial wavelengths) in a shearing interferometer can be limited by the minimum achievable shearing distance, the minimum spot size of the measurement probe (e.g. the pixel size of an imaging array), or a combination of both. In some shearing interferometers, the shearing distance may be the main limiting factor (shearing distance on the order of a few millimeters, pixel size on the order of 100's of micrometers or less) with the critical spatial wavelength corresponding to approximately twice of the shearing distance. Shorter shearing distances may be implemented, but may result in a less sensitive interferometer. In a reflection-mode shearing interferometers, for example, the slope per fringe=$\lambda/2\omega$, where $\lambda$ is the probe wavelength and $\omega$ is shearing distance.

If the configuration of a given shearing interferometer allows adjustment of the shearing distance, multiple sets of interferograms may be collected from the same specimen at difference shearing distances. In this case, when the data sets are taken in pairs, the effective shearing distance of the two sets of data can be made to be the difference between the shearing distances of the two sets.

First, consider two measurements for a data set with two different shearing distances $\omega 1$ and $\omega 2$, respectively, with the following interferograms:

$$S(x_1+\omega_1,x_2)-S(x_1,x_2)=n_1\lambda \quad (1)$$

$$S(x_1+\omega_2,x_2)-S(x_1,x_2)=n_2\lambda \quad (2)$$

where n1 and n2 are represent the fringe orders where constructive interference occurs at n=0, 1, 2, 3, etc. and destructive interference occurs at n–0.5, 1.5, 2.5, etc. The difference of two measured interferograms can be written as $$S(x_1+\omega_1,x_2)-S(x_1+\omega_2,x_2)=(n_1-n_2)\lambda$$

Equation (3) can be re-written as $$S(x_1+(\omega_1-\omega_2),x_2)-S(x_1,x_2)=(n_1-n_2) \quad (30)$$

Equation (4) suggests that the combination of the two data sets yields a data set or new interferogram having an effective shearing distance represented by the difference of the two shearing distances of the individual data sets. Using this feature, the spatial frequency response of the system may be optimized by selecting an effective shearing distance equal to the spot size of the probe.

The practical implementation of this methodology may be achieved using 1) the interferometer system designed with two distinct interferometer paths of different shearing distances, 2) the interferometer system with a single interferometer path, whose shearing distance can be adjusted to obtain different inteferograms with different shearing distances. Configuration 1 has the advantage that the two data sets can be acquired simultaneously and that the two paths are fixed and hence it is easier to maintain uniform and repeatable shearing distances in each path. Configuration 2 has the advantage that it has fewer components and hence can be more compact and less expensive.

In the CGS interferometer, the shearing distance may be adjusted by changing the grating separation, probe wavelength or grating pitch.

Adjustment of the grating separation in CGS may be achieved using an actuator as described above. As an example, in a system configured with gratings having a pitch of 25 micrometers and a probe wavelength of 632.8 nm, the grating separation would have to be increased by ~39 microns for each micron increase in shearing distance. In order to achieve changes in shearing distance on the order of a few micrometers, a piezo-electric transducer (PZT) system may be appropriate, whereas a precision motor-driven stage system may be more appropriate for changes in the grating separation that result in changes in the shearing distance on the order of 10's or 100's of micrometers. In either case, some additional metrology (e.g. displacement transducers) may be necessary to assure that the change in grating separation (and hence shearing distance) is uniform. Such a system has the advantage that the adjustment of shearing distance is continuous and the disadvantage that it may be difficult to change the grating separation uniformly to maintain uniform shearing distance across the field-of-view.

Using the probe wavelength to change the shearing distance may be implemented by using either distinct sources that are shuttered or by using a laser in which the wavelength can be tuned (e.g. an Ar-ion laser). As an example, in a system configured with gratings having a pitch of 25 micrometers and a fixed grating separation, the changing the probe wavelength from 632.8 nm to 514 nm would change the shearing distance by 35.64 micrometers. Such a system has the advantage that the change in the shearing distance can be made uniformly and the disadvantages that only discrete changes in the shearing distance are possible (based on available source wavelength) and that the optical system of the interferometer can be designed to respond identically to the two wavelengths (through design or adjustment).

When the pitch of the gratings is used to change the shearing distance in CGS, two pairs of transmissive gratings that have a fixed line pattern on a glass or similar substrate may be used in two independent interferometer paths. The two pairs have two distinct sets of gratings, each having different pitch. Alternately, a line pattern for a grating may be generated electronically or optically in a manner that is adjustable. For example, an acoustic grating may be used to produce the adjustable grating pitch for changing the shearing distance.

The configuration of the shearing interferometer system for a given application depends on the power spectral density (amplitude versus spatial frequency) of the component being tested. Specifically, the slope sensitivity, $\lambda/2\omega$), can be selected to ensure that the amplitude can be characterized with an acceptable signal to noise ratio and the shearing distances can be selected to ensure that the spatial frequency can be characterized (adheres to Nyquist's sampling theorem). In this way, the system can be optimized for a given type of sample. The practical implication of the optimization is that the sample can be characterized with the minimum amount of data, which in turn facilitates efficient computation and analysis as well as data storage.

Some practical limitations may exist in selecting both the slope sensitivity and shearing distances. For the slope sensitivity, the practical limit may be the intensity level resolution of the imaging system and the probe wavelength. As an example of a first order estimate, a CCD array with 10-bit resolution (1024 gray scales) theoretically can resolve 1/2048th of a fringe (intensity variation from black to white represents ½ a fringe). If the probe wavelength is 632.8 nm the minimum difference in height that can be resolved across the shearing distance is –0.31 nm (see equation 1). In practice, it may not be possible or feasible to access the full dynamic range of the image sensor and noise sources may limit the signal that can be extracted reliably. Maximizing the dynamic range of the image sensor and/or minimizing the probe wavelength may be used to characterize smaller amplitudes.

The selection of the shearing distances (and hence spatial frequency response) may be subject to the some limitations and trade-offs. First, the in-plane spatial wavelengths cannot be smaller than approximately twice the probe wavelength. Second, for an image array/sensor of fixed size, the field-of-view decreases linearly with the spot/pixel size. Third, the selected shearing distances define a region around the edge of the sample over which interference data is cannot be collected. Thus, the larger the individual shearing distances, the more limited the data collection at the edge of the sample becomes.

The above CGS and other optical shearing interferometry systems may be used to measure slopes and curvatures of various features and components formed on a substrate either directly or indirectly. In the direct measurement, the probe beam can be directly sent to the patterned top surface of these devices to obtain the curvature information. The surface features and components and their surrounding areas on the top surface may be smooth and optically reflective to be accurately measured. For example, some completed integrated circuits have a top passivation layer, usually made of a non-conductive dielectric material, over the circuit elements on the substrate to protect the underlying circuits. The surface of the passivation layer is in general smooth and is sufficiently reflective for this direct measurements.

In some situations, the above direct measurements based on reflection from the patterned surface may be difficult to implement. For example, features and components formed on the front side of a substrate or their surrounding areas may not be optically reflective. In addition, the effectiveness and accuracy of this direct measurement based on reflection from the patterned top surface may be adversely affected if the properties of the features and components and their surrounding areas other than their slopes and curvatures significantly contribute to the wavefront distortion because the wavefront distortion under such circumstance is no longer an indicator of the global slopes and curvatures of the area illuminated by optical probe beam. The features and components on the front side may distort the reflected wavefront due to factors other than the global slopes and curvatures, such as the local height of a feature or component being different from its surrounding areas. In these and other situations, the curvatures of the features or components may be indirectly measured by inference from the curvature measurements of the corresponding locations on the opposite, unpatterned surface on the back side of the substrate. This is possible because the stresses in the non-continuous features and components formed on the substrate can cause the substrate to deform and the thin films formed over the substrate generally conform to the global curvature of the substrate surface.

When the heights of certain features are different from their surroundings, the phase distortion on the wavefront of the reflected probe beam for each feature includes at least the portion contributed from the height difference and the portion contributed from the curvatures. Since the backside surface is not patterned, any optical interferometer, including non-shearing interferometers may be used to process the reflection from the backside surface to obtain the surface curvature information. For example, non-shearing Twyman-Green and Michaelson interferometers may be used to obtain optical measurements on the unpatterned backside surface of a wafer.

Notably, the patterned front or top surface of a wafer may be optically measured with a phase-shifting shearing interferometer described above and the unpatterned backside surface may be optically measured with any interferometer including shearing or a non-shearing interferometer. Both measurements may be processed or correlated to improve the overall measurements of the patterned front surface. The surface information from the unpatterned backside surface may be used to provide the overall global surface slope information of the wafer. The surface information from the patterned front side surface, which may be advantageously obtained from a shearing interferometer, may be used to provide detailed local surface information on the patterned front surface.

Figure 12:
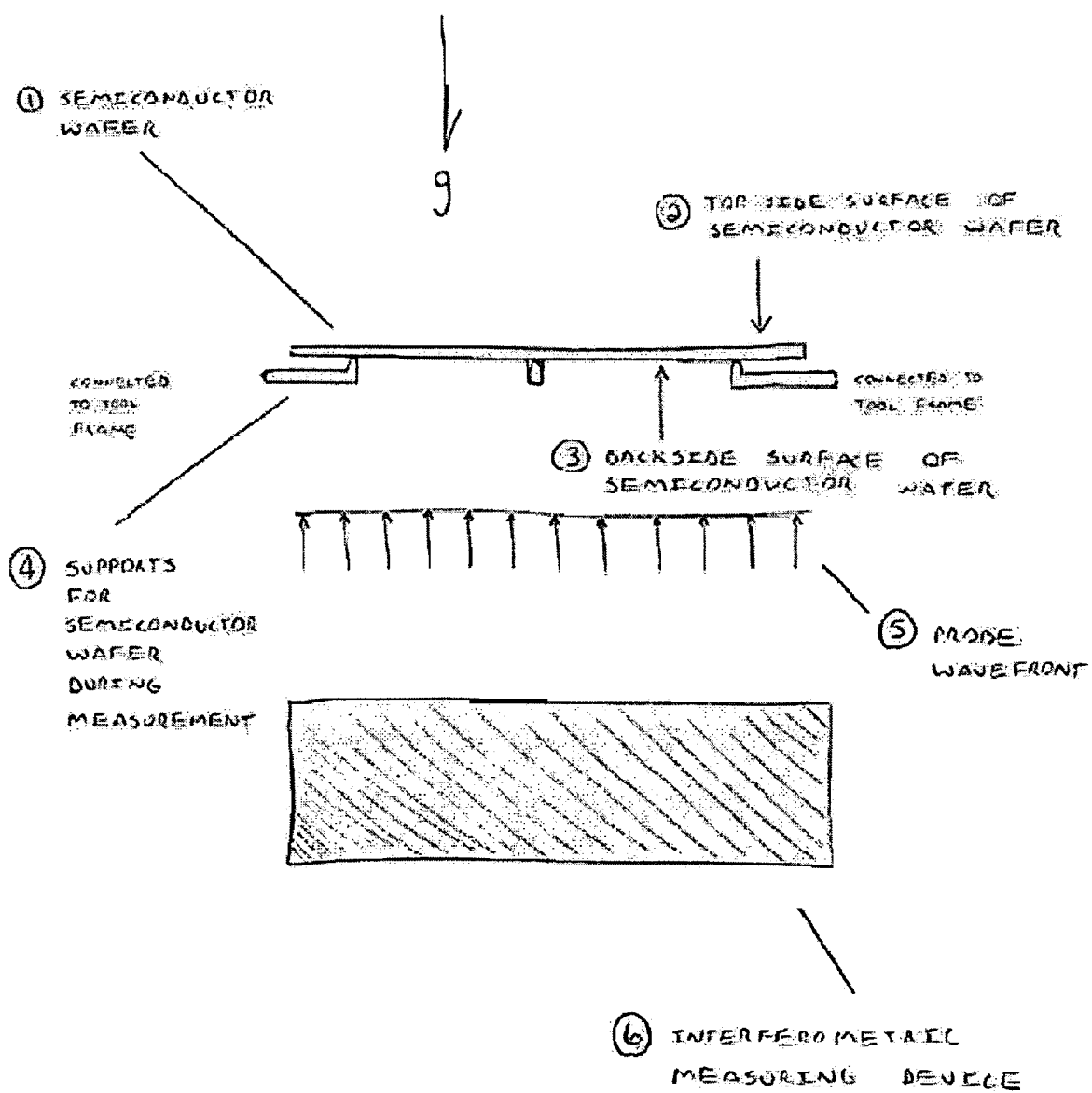
FIG. 12 illustrates an exemplary layout for optically measuring the backside surface of a wafer where wafer supports are in contact with the backside surface.

In implementation, the backside surface of a wafer may be supported by wafer supports in part because the patterned front surface, such as circuits and other micro structures, may be damaged by contact of such support members. FIG. 12 illustrates an exemplary layout for optically measuring the backside surface of a wafer. The wafer supports in contact with the backside surface may affect the optical measurements for being present in the illuminate area and thus partially prevent the reflected beam to obtain the surface information in the areas occupied by the wafer supports. Such effects of the supports are undesirable and should be removed.

Figure 13:
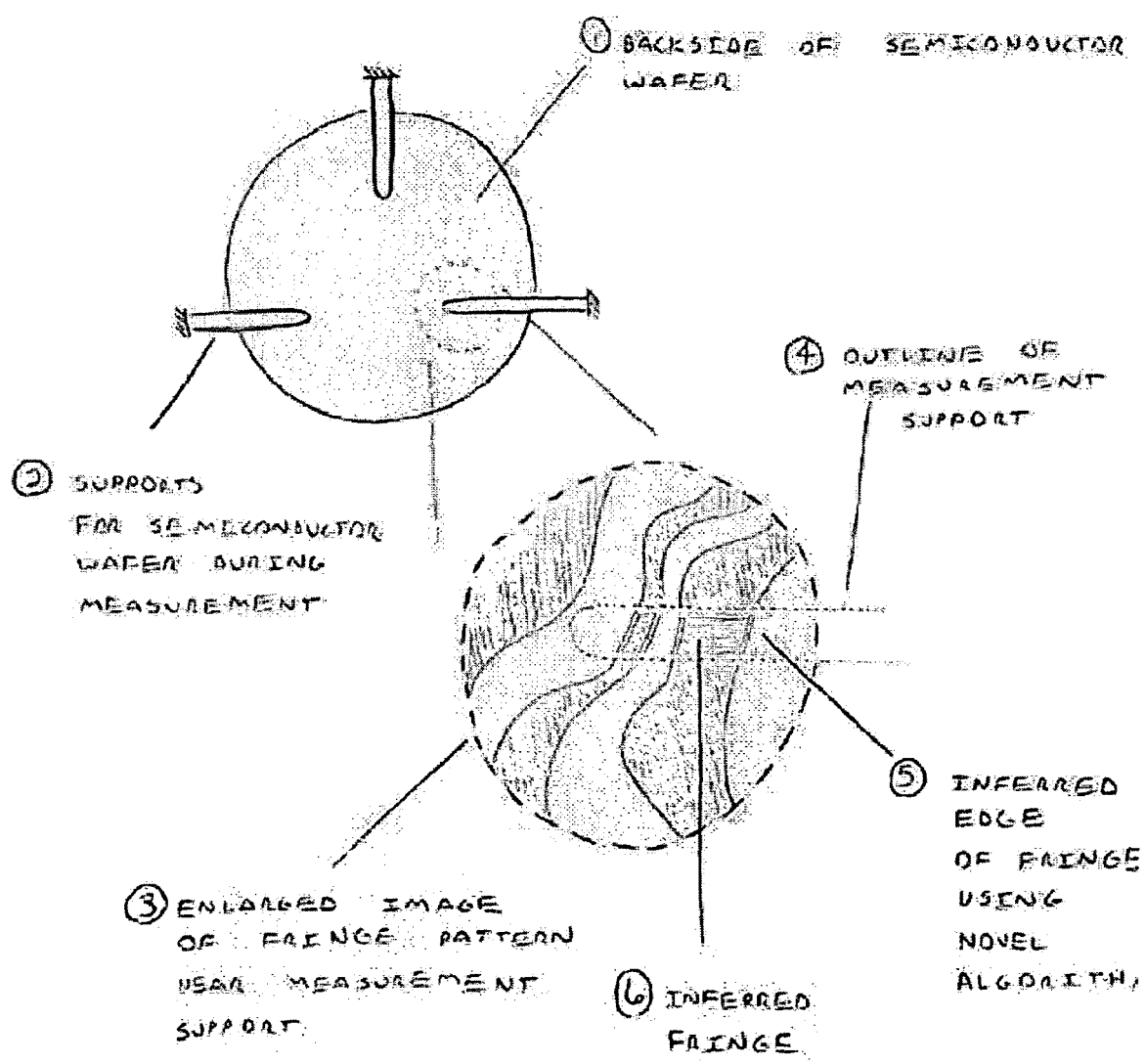
FIG. 13 illustrates an example where the backside of the wafer is supported by three wafer supports that are oriented in a non-symmetric way to enable direct collection of data on the full wafer surface by making multiple measurements of the wafer at different angular orientations.

FIG. 13 illustrates an example where the backside of the wafer is supported by three wafer supports that are oriented in a non-symmetric way to enable direct collection of data on the full wafer surface by making multiple measurements of the wafer at different angular orientations. Not shown is the hardware the places the wafer onto the thin supports in one of any number of angular orientations (placement and rotational devices like these are common in the automation industry). FIG. 13 further illustrates that measurement of the backside of the wafer results in an interference pattern that contains discontinuities because of the presence of the three point supports in the measurement field. In a traditional arrangement, these fringes would prevent the conversion of the fringe pattern to meaningful data. A number of techniques are described here to allow measurements in the areas occupied by the wafer supports.

In one implementation, an interpolation algorithm is used to effectively interpolate the fringe pattern across the discontinuities of the fringes due to presence of the wafer supports. The interpolated fringe edges enable the calculation of an inferred fringe that can be used in a standard interferometric processing algorithm. The algorithms used to generate these inferred fringes may use a linear interpolation, a Spline interpolation, a higher order polynomial interpolation, and a number of algorithms using spatial filtering and one of more of the previous described techniques. The spatial filtering coefficients can be derived by analyzing experimental and theoretical data on wafer deformations caused by semiconductor and MEMs manufacturing processes.

Once the interpolation is completed, the software that drives the device also performs a 'sense check' on the resulting, inferred fringes based on spatial frequency content and consistency with other fringes on the wafers.

In many cases, these algorithms will be sufficient to enable the calculation of the processing of the interferometric fringe data into meaningful information on wafer shape, slopes, curvatures, and stresses. However, in cases where higher levels of measurement resolution are required, the device will make measurements of the backside of the wafer at multiple angular orientations. The device then compares the multiple images for consistency and fills in missing data from one image (i.e., parts of the wafer that were covered by the supports) with data from another image (i.e., an image that was acquired at a different orientation, where a given part of the wafer covered in the former image by the support pins, is no longer covered). The algorithms for performing this calculation are straightforward.

The device may also use transparent, lens quality support pins that are essentially invisible to the probe wave front. These support arms and pins are machined from machine quality quartz and polished via a complex lapping process.

Only a few implementations are described. However, it is understood that variations and enhancements may be made.

What is claimed is:

1. A method, comprising:
providing a flat panel, substrate or wafer having opposing front and back surfaces, the surfaces having corresponding positions;
using an optical probe beam with a substantially uniform wavefront to illuminate at least the back surface to produce a reflected probe beam with a reflected wavefront that carries distortions caused by an illuminated area on at least the back surface;
directing the reflected probe beam through an optical shearing interferometer device to obtain an optical interference pattern between the reflected wavefront and another replica of the reflected wavefront that is spatially shifted by a shearing distance;
adjusting a phase shift between the reflected wavefront and the replica of the reflected wavefront to obtain a plurality of phase-shifted interference patterns of different phase shifts from the optical shearing interferometer; and
processing the interference patterns to obtain information on surface slopes of at least one portion of the front surface, the at least one portion of the front surface corresponding to the illuminated area of at least the back surface.

2. The method as in claim 1, further comprising using a coherent gradient sensing (CGS) system with diffraction gratings as the optical shearing interferometer.

3. The method as in claim 1, further comprising using a radial shear interferometer as the optical shearing interferometer.

4. The method as in claim 1, further comprising using a bi-lateral shearing interferometer with a wedge plate as the optical shearing interferometer.

5. The method as in claim 1, further comprising using prisms in the optical shearing interferometer to produce the optical interference pattern between the reflected wavefront and the replica of the reflected wavefront.

6. The method as in claim 1, further comprising adjusting the phase shift to produce phase shifts of 0, 90, 180, 270, and 360 degrees.

7. The method as in claim 1, further comprising applying an algorithm in processing of the interference patterns of different phase shifts to compute the phase information to extract information on surface slopes.

8. The method as in claim 7, further comprising applying a minimum discontinuity (MDF) algorithm within the algorithm.

9. The method as in claim 7, further comprising applying a preconditioned conjugate gradient (PCG) algorithm within the algorithm.

10. The method as in claim 7, further comprising applying a branch cut minimization algorithm within the algorithm.

11. The method as in claim 7, further comprising applying a tiled modulation guided algorithm within the algorithm.

12. The method as in claim 7, further comprising statistically fitting a surface polynomial to the surface slopes.

13. The method as in claim 12, further comprising using a Zernicke polynomial as the surface polynomial.

14. The method as in claim 12, further comprising applying integration and differentiation procedures to a statistic surface fit of the surface slopes.

15. The method as in claim 1, further comprising using the surface slopes to obtain curvature information of the illuminated area.

16. The method as in claim 1, further comprising using the surface slopes to obtain information on stress in the illuminated area.

17. The method as in claim 1, further comprising applying a phase extraction algorithm in processing the interference patterns.

18. The method as in claim 17, wherein the phase extraction algorithm includes one selected from Bucket A, Bucket B, and Bucket C algorithms.

19. The method as in claim 12, further comprising using a Lengendre polynomial as the surface polynomial.

20. A system, comprising:
a flat panel, substrate or wafer having opposing front and back surfaces, the surfaces having corresponding positions;
a collimated radiation source to produce a collimated probe beam onto an area of at least the back surface to illuminate the area of at least the back surface;
an optical shearing interferometer device positioned to receive the optical probe beam reflected from the at least back surface and to cause an optical interference between a reflected wavefront of the optical probe beam and another replica of the reflected wavefront that is spatially shifted by a shearing distance, wherein the optical shearing interferometer is operable to adjust a phase shift between the reflected wavefront and the replica of the reflected wavefront to obtain a plurality of phase-shifted interference patterns of different phase shifts;
an imaging device to capture the interference patterns produced by the optical shearing interferometer; and
a processing device to process the interference patterns captured by the imaging device to extract information on surface slopes of at least one portion of the front surface, the at least one portion being or corresponding to the illuminated area of the at least back surface.

21. The system as in claim 20, wherein the optical shearing interferometer comprises a coherent gradient sensing (CGS) system with diffraction gratings.

22. The system as in claim 20, wherein the optical shearing interferometer comprises a radial shear interferometer.

23. The system as in claim 20, wherein the optical shearing interferometer comprises a bi-lateral shearing interferometer with a wedge plate.

24. The system as in claim 20, wherein the optical shearing interferometer comprises prisms which operate to produce the optical interference pattern between the reflected wavefront and the replica of the reflected wavefront.

25. The system as in claim 20, wherein the optical shearing interferometer adjusts the phase shift to produce phase shifts of 0, 90, 180, 270, and 360 degrees.

26. The system as in claim 20, wherein the processing device is programmed to unwrap phase information in the interference patterns of different phase shifts to extract information on the surface slopes.

27. The system as in claim 26, wherein the processing device is programmed with a minimum discontinuity (MDF) algorithm to unwrap the phase information.

28. The system as in claim 26, wherein the processing device is programmed with a preconditioned conjugate gradient (PCG) algorithm to unwrap the phase information.

29. The system as in claim 26, wherein the processing device is programmed with a branch cut minimization algorithm to unwrap the phase information.

30. The system as in claim 26, wherein the processing device is programmed with a tiled modulation guided algorithm to unwrap the phase information.

31. The system as in claim 26, wherein the processing device is operable to statistically fit a surface polynomial to the surface slopes.

32. The system as in claim 31, wherein the processing device is programmed to apply a Zernicke polynomial for the statistic fitting.

33. The system as in claim 31, wherein the processing device is operable to apply integration and differentiation procedures to a statistic surface fit of the surface slopes.

34. The system as in claim 20, wherein the processing device is operable to use the surface slopes to obtain curvature information of the illuminated area.

35. The system as in claim 20, wherein the processing device is operable to use the surface slopes to obtain information on stress in the illuminated area.

36. The system as in claim 31, wherein the processing device is programmed to apply a Lengendre polynomial for the statistic fitting.

37. The system as in claim 20, wherein the processing device is programmed to apply a phase extraction algorithm in processing the interference patterns.

38. The system as in claim 37, wherein the phase extraction algorithm includes one selected from Bucket A, Bucket B, and Bucket C algorithms.

* * * * *